(12) United States Patent
Freedman et al.

(10) Patent No.: US 7,624,794 B2
(45) Date of Patent: Dec. 1, 2009

(54) NON-CONDUCTIVE AND NON-MAGNETIC FLOWLINE FOR ELECTROMAGNETIC MEASUREMENTS ON RESERVOIR FLUIDS AT HIGH PRESSURES

(75) Inventors: Robert Freedman, Houston, TX (US); Krishnamurthy Ganesan, Sugar Land, TX (US); Douglas W. Grant, Austin, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 256 days.

(21) Appl. No.: 11/419,233

(22) Filed: May 19, 2006

(65) Prior Publication Data

US 2008/0035332 A1   Feb. 14, 2008

(51) Int. Cl.
*E21B 47/00* (2006.01)
(52) U.S. Cl. .................... 166/66.5; 166/264; 73/152.18
(58) Field of Classification Search ............ 166/250.01, 166/264, 66, 66.5; 73/152.18
See application file for complete search history.

(56) References Cited

U.S. PATENT DOCUMENTS

| | | | | |
|---|---|---|---|---|
| 5,597,522 | A * | 1/1997 | Curzon et al. | 264/177.16 |
| 5,609,205 | A * | 3/1997 | Massie et al. | 166/163 |
| 5,901,788 | A * | 5/1999 | Brown et al. | 166/264 |
| 6,276,401 | B1 * | 8/2001 | Wilson | 138/172 |
| 6,346,813 | B1 * | 2/2002 | Kleinberg | 324/303 |
| 6,938,469 | B2 * | 9/2005 | Ganesan | 73/152.18 |
| 6,952,096 | B2 * | 10/2005 | Freedman | 324/303 |
| 2006/0240216 | A1 * | 10/2006 | Stepanian et al. | 428/76 |
| 2007/0102055 | A1 * | 5/2007 | Blair et al. | 138/114 |

* cited by examiner

*Primary Examiner*—William P Neuder
(74) *Attorney, Agent, or Firm*—Darla P. Fanseca; Jaime Castano; Dale Gaudier

(57) ABSTRACT

An apparatus and method to perform measurements on fluid in a wellbore fluid sample tool in which at least a portion of the flowline of the sample tool is made of a non-magnetic and non-conductive material.

33 Claims, 4 Drawing Sheets

NON-CONDUCTIVE AND NON-MAGNETIC FLOWLINE FOR ELECTROMAGNETIC MEASUREMENTS ON RESERVOIR FLUIDS AT HIGH PRESSURES

TECHNICAL FIELD

The present invention pertains to making measurements on fluids in a flowline of a wellbore fluid sampling tool. Fluid sampling tools are disposed in the borehole of an oil or gas well and used to evaluate fluids that are pumped from the earth formations surrounding the borehole.

BACKGROUND OF THE INVENTION

In the field of hydrocarbon exploration, measurements are often made on reservoir fluids in the flowline of a fluid sampling tool. Such measurements are typically made to obtain information on different reservoir fluid properties, e.g., resistivity, nuclear magnetic resonance (NMR), optical absorption and scattering, dielectric constant, etc. Borehole fluid sampling tools have one or more probes that are pressed against the borehole wall so that reservoir fluids can be pumped out of the earth formations into a flowline situated in the fluid sampling tool. The same tools may also be used to measure reservoir pressures. Fluid sampling tools are widely used in the well-logging industry. Fluid sampling borehole tools are offered by all of the major oilfield service companies. For example, Schlumberger Technology Corporation offers fluid sampling and pressure measurements using a sampling tool called the Modular Dynamics Tester (MDT). Other companies offer fluid sampling tools such as the Reservoir Description Tool (RDT) and the Reservoir Characterization Instrument (RCI). Those tools operate in high pressure and high temperature reservoirs. The pressure of the reservoir fluids in the flowline can exceed 25,000 pounds per square inch, and temperatures can approach or even exceed 200° C. Because of the high temperatures and pressures, the flowlines used in commercial fluid sampling tools are typically made of steel.

However, a metal flowline attenuates electromagnetic (EM) radiation from antennas or other transmitters situated outside of the flowline. The attenuation caused by metallic or highly conductive steel flowlines causes severe signal-to-noise ratio problems for measurements made by EM sensors situated outside of the flowline.

One solution to the attenuation problem caused by steel flowlines is to use sapphire windows embedded on opposite sides of the steel flowline. This is the solution used in the Schlumberger Optical Fluid Analyzer, which is a module within the MDT tool. The windows allow transmission of electromagnetic radiation in the near infrared frequency band through the fluid to measure the optical density of the fluid. However, the steel flowline with embedded sapphire windows is generally not suitable for use when placing an antenna or electromagnetic coil outside of the flowline to make measurements on the fluids because the effects of the steel flowline typically adversely affect the electromagnetic measurements. It has been proposed to place one or more electromagnetic coils inside of a steel flowline; however, the abrasive and corrosive nature of the fluid may damage the coils. Such placement, however, may be useful if the fluid velocity in the flowline is low or temporarily stopped and the fluid is not too corrosive.

Another prior art solution includes a sensor for measuring the resistivity of the fluids in the flowline. The sensor apparatus includes electrodes that are inserted into the fluid through a thick polyetheretherketone ("Peek") body. This technique has at least two potential drawbacks. First, the electrodes are in the flowline in contact with potentially abrasive and corrosive fluids. Again, this may not be much of a problem if the fluid velocity within the flowline is sufficiently slow and the nature of the fluid is not too corrosive. Second, it is difficult to reliably seal the interfaces between the electrodes and the Peek body. Solving that problem may lead to extra cost or design complexity, but again is not insurmountable. Thus, electrodes and coils disposed in the interior of a steel flowline may be a viable measurement method under the right circumstances.

BRIEF SUMMARY OF THE INVENTION

The present invention pertains to an apparatus and method to perform measurements on fluid in a wellbore fluid sample tool in which at least a portion of the flowline of the sample tool is made of a non-magnetic and non-conductive material. A preferred embodiment has a non-magnetic and non-conductive portion of the flowline joined to a steel portion of the flowline. As used herein, "non-magnetic" means a material whose magnetic permeability, $\mu$, is approximately that of a vacuum ($\mu \approx 1$), and "non-conductive" means a material that does not readily conduct electric charge. In this preferred embodiment, the non-magnetic and non-conductive section of the flowline is constructed of a ceramic material that causes minimal interference with the operation of sensors (e.g., electromagnetic coils) placed externally thereto. A reinforcing composite wrap may be applied over the ceramic tube and possibly one or more sensors. The reinforcing wrap supports the walls of the ceramic tube against the pressure from the fluid, thereby maintaining integrity of the flowline section when used with high-pressure fluids.

In operation, this preferred embodiment takes advantage of the non-magnetic and non-conductive properties of the ceramic by subjecting the fluid to electromagnetic radiation and/or magnetic fields from EM sensors outside of the flow path. Such measurements can be made with little or no adverse effects from the ceramic material. Also, since the sensors are external to the flow path, the sensors are not subjected to the potential corrosiveness or abrasiveness of the fluids. The invention is not, however, limited to sensors outside the flowline. Sensors can be placed inside the flowline, outside the flowline, or both.

In another aspect, various embodiments provide one or more techniques to join the non-magnetic and non-conductive portion of the flowline to the remaining (conventional) portion of flowline. In one example, a floating connection adapter is pushed against the ceramic tube with a spring. The diameter of an adapter seal interface is designed so that it is slightly larger than the outside diameter of an associated face seal O-ring. Compressive forces on the adapter increase with increasing pressure, providing a reliable seal. In another example, a fitting is adapted to fit within an inner diameter of the non-conductive and non-magnetic section, and the fitting includes an O-ring. The fitting is then placed inside the inner diameter with the O-ring contacting the inner diameter, thereby creating a seal.

The foregoing has outlined rather broadly the features and technical advantages of the present invention so that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features that are believed to be characteristic of the invention, both as to its organization and method of operation, together with further objects and advantages will be better understood from the following description when considered in conjunction with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following detailed description taken in conjunction with the accompanying drawings, in which.

DETAILED DESCRIPTION OF THE INVENTION

Figures 1, 2, 3A:
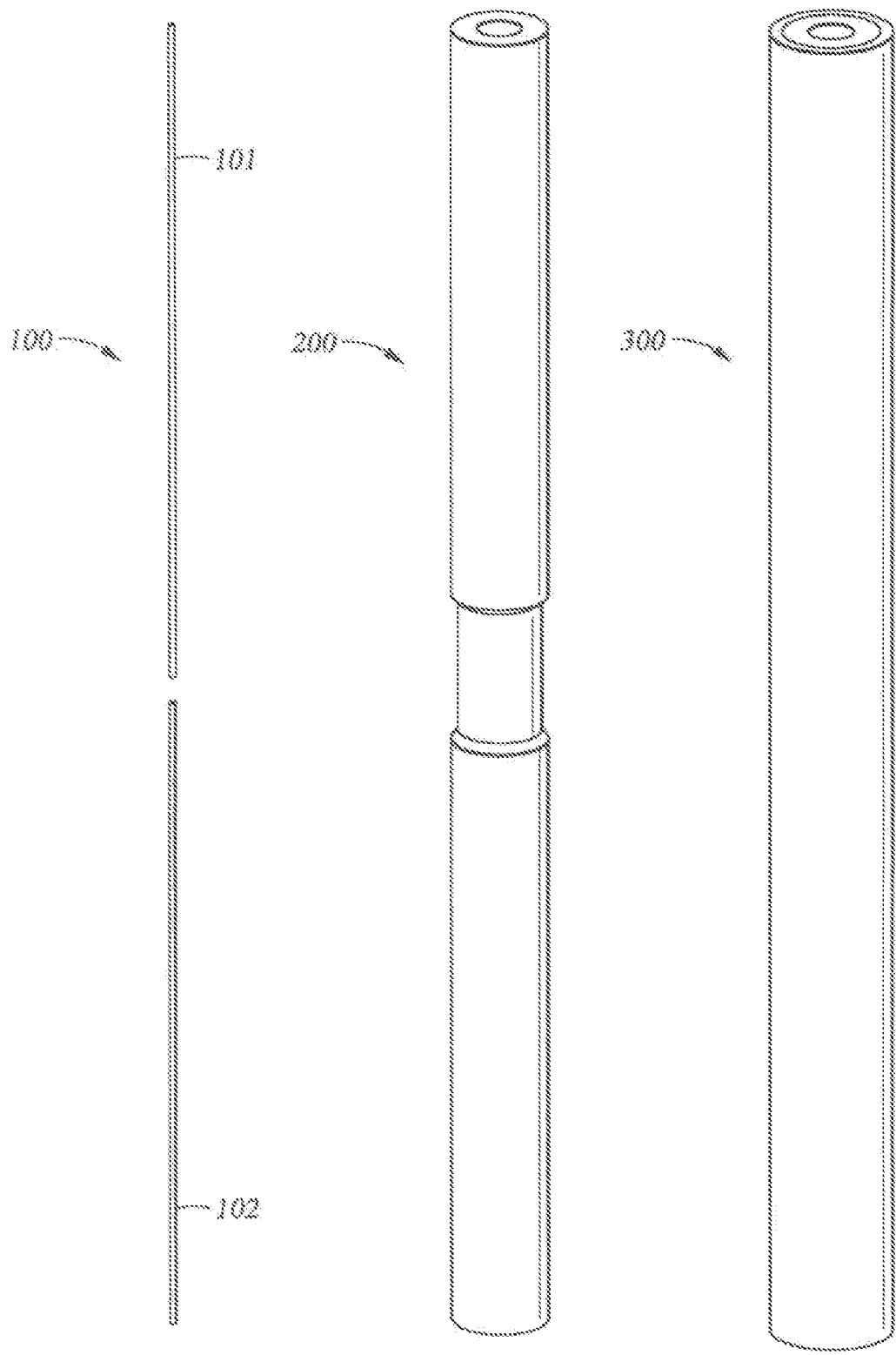
FIG. 1 is an illustration of a flowline having a non-conductive and non-magnetic portion in accordance with one embodiment of the invention.
FIG. 2 shows the exterior profile of the non-conductive and non-magnetic portion of the flowline of FIG. 1.
FIGS. 3A and 3B are side and prospective end views, respectively, of the non-conductive and non-magnetic portion of the flowline of FIG. 2 a with reinforcing wrap.

FIG. 1 is an illustration of exemplary system 100 according to one embodiment of the invention. System 100 is a flowline in a fluid sampling tool or other device and is used to convey high-pressure fluids. In a third sampling tool fluid pressures in the flowline can vary from a few thousand psi (kpsi) to more than 30 kpsi. Flowline 100 includes a first portion 101 and a second portion 102. First portion 101 provides most of the length for flowline 100 and, in this example, is made of steel or other metal alloy that is capable of conveying the high-pressure fluid. Second portion 102 is adapted to be joined to first portion 101 and, in contrast to first portion 101, is constructed of a non-magnetic and non-conductive material.

While in this example second portion 102 is referred to as a part of flowline 100, it is also correct to say that first portion 101 is a flowline and that second portion 102 is an attachment thereto. Either terminology is correct, as long as it contemplates that the second portion 102 defines part of the flow path. Further, "tube" or "tubular" as used herein may refer to a hollow line with any length, cross-sectional shape, or diameter (inner or outer) and may be straight, curved, or angled.

FIG. 2 is an illustration of an exemplary apparatus 200 according to one embodiment of the invention. Apparatus 200 is one example of a non-conductive and non-magnetic flow-tube portion that may be employed in a system such as system 100 (FIG. 1) as second portion 102. Apparatus 200 is a six-inch long zirconia-based ceramic tube that has a wall thickness of 3.5 mm at its ends and 2.0 mm in the central, necked-down region. The inside diameter is 5.6 mm. An appropriate ceramic material is YTZP (Yttria Partially-Stabilized Zirconia), a Hot Isostatically Pressed ("hipped") zirconia, that is available from a variety of sources. The shape and dimensions provided above are as examples only and the invention is not so limited.

Figure 3B:
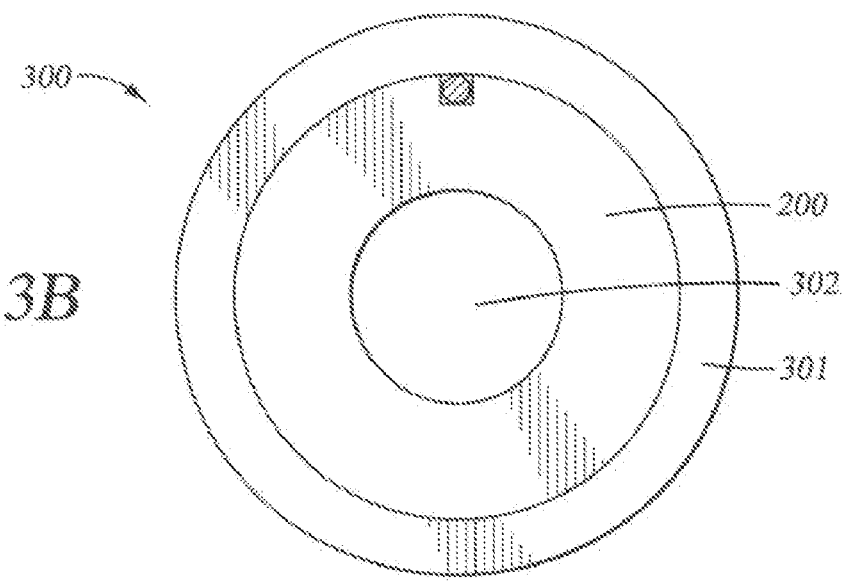

An embodiment of the present invention, such as apparatus 200, may be required to survive pressures and temperatures up to around 30.5 kpsi and 400° F. (204.4° C.), respectively. To provide more support to apparatus 200, some embodiments may include one or more features that reinforce apparatus 200. FIGS. 3A and 3B are illustrations of exemplary apparatus 300 according to one embodiment of the invention. Apparatus 300 includes the zirconia-based ceramic tube of FIG. 2 supported by S2/Fiberglass and Peek composite fibers 301 (e.g., with 28% Peek) that are tightly wrapped around the tube. The wrapping typically has a thickness of only a few millimeters. The end view of FIG. 3B shows flow path 302. With such reinforcement, apparatus 300 may survive fluid temperatures and pressures up to, and even exceeding, 419° F. (215° C.) and 36 kpsi, respectively. The S2/Fiberglass and Peek composite fibers 301 are also non-magnetic and non-conductive. The fiberglass may also be held together with high temperature resins or varnish instead of the Peek.

One of the advantages of a non-magnetic and non-conductive section of flowline is that a variety of testing devices may use electromagnetic signals to detect physical qualities of the fluid from locations external to the flow path. For instance, in some embodiments, a radio frequency (RF) coil is wrapped around at least a section of a non-magnetic and non-conductive tube to perform NMR analysis on the fluid. The non-magnetic quality of the flowline section affords little, if any, interference to the magnetic field used to magnetize the NMR-sensitive nuclei in the fluid. Further, the non-conductive property of the section of flowline insures that the electromagnetic signals from the RF coil are transmitted into the fluid without loss or attenuation. The present invention is not, however, limited to external sensors or sources. Electrodes, magnets, coils, or other sensors may be placed inside the flowline, outside the flowline, or both.

Figure 4:
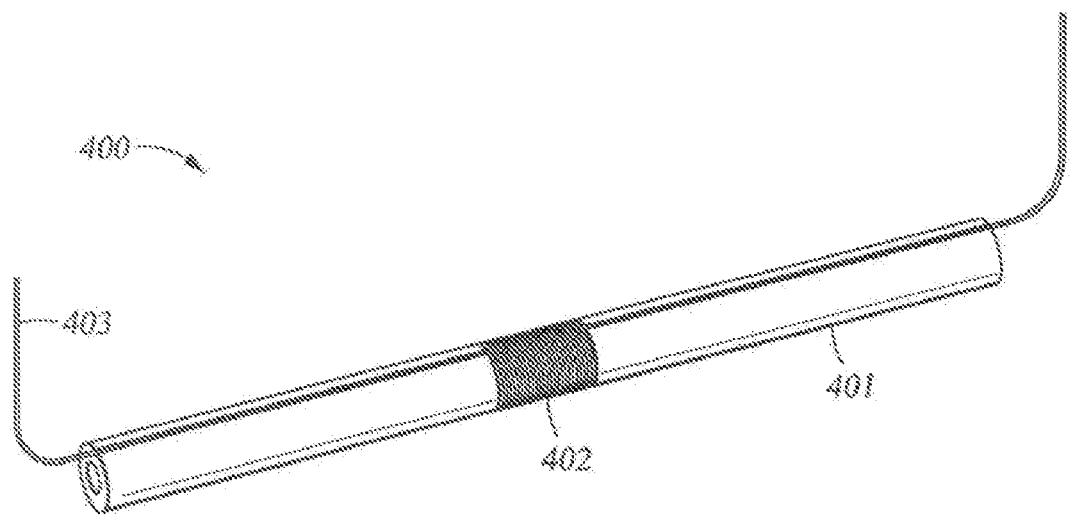
FIG. 4 shows the non-conductive and non-magnetic portion of the flowline of FIG. 2 with wire wrapped around a portion of its outer surface.

FIG. 4 is an illustration of exemplary system 400 according to one embodiment of the invention for performing measurements on high-pressure and/or high temperature fluids. System 400 includes non-magnetic and non-conductive tube 401 and RF coil 402 that is made by wrapping wire 403 around tube 401. Tube 401 may, in some examples, be a YTZP ceramic tube, as in FIG. 2. RF coil 402 can be used to excite NMR sensitive nuclei in the fluid. Proximity of coil 402 to the fluid generally improves the signal-to-noise ratio for the RF signal, and system 400 allows placement of RF coil 402 in such close proximity. In system 400, RF coil 402 is placed on the ceramic tube before wrapping the tube with the S2/Fiberglass and Peek composite fibers. Specifically, in system 400, RF coil 402 and associated wiring 403 are placed into grooves that are cut into tube 401. In this example, the groove's dimensions conform to those of the wire so that the top of the wire is flush with the surface of tube 401. The two ends of wire 403 are used to connect RF coil 402 to a power generator (not shown). In FIG. 4, the two ends are shown running out of opposite ends of tube 401; however, it is also possible to run both ends out of the same end of tube 401.

RF coil 402 may be used to perform a variety of measurements, including, but not limited to, measurements to determine: (1) the EM properties (e.g., fluid resistivity and dielectric constant), (2) the NMR properties of the fluid (e.g., transverse and longitudinal relaxation times, diffusion coefficients, and hydrogen index) and (3) the Electron-Spin Resonance properties of the fluid. The frequency of the electromagnetic signals can range from a few Hertz or less to microwave frequencies, depending on the specific type of measurement.

While system 400 includes RF coil 402, various embodiments are not limited to that shown. Other embodiments may include one or more measurement sensors in addition to or instead of an RF coil placed on or near the exterior of tube 401. For instance, a pulsed field gradient coil may also be wrapped around the outside of tube 401 for performing NMR measurements. Further, an embodiment may include a coil pair (transmitter and receiver) both wrapped around the outside of tube 401 to perform resistivity measurements on the fluid. Yet another embodiment may use an antenna pair (transmitter and receiver) to perform spin resonance measurements on the fluids. In fact, other sensors now known or later developed may be used additionally or alternatively to RF coil 402 in various embodiments. Sensors and sources may also be placed in the interior of tube 401, or one or more sensors and sources may be placed in the interior of tube 401 while others are disposed exterior to tube 401.

Figure 5:
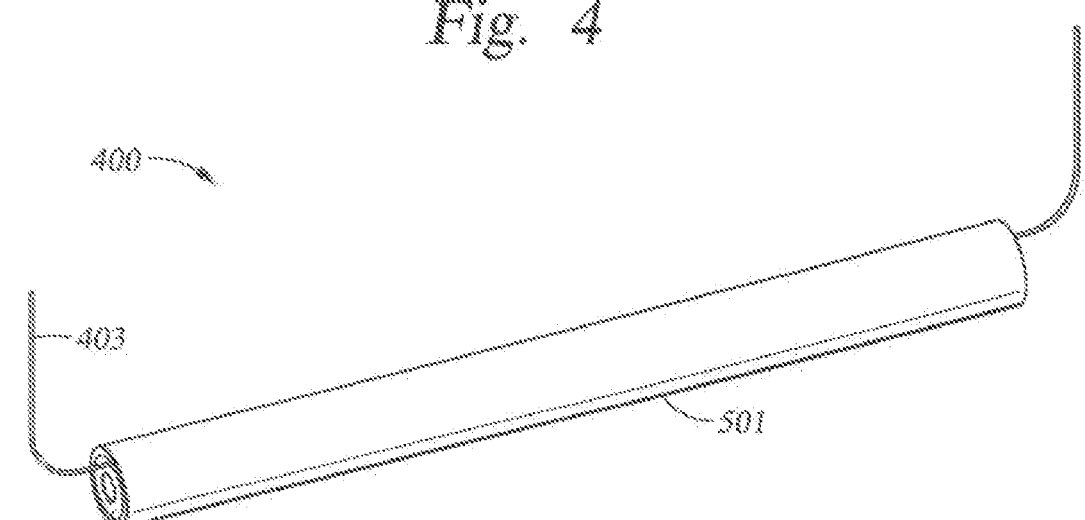
FIG. 5 shows the non-conductive and non-magnetic portion of the flowline of FIG. 4 with a reinforcing wrap.

FIG. 5 is an illustration of exemplary system 500 according to one embodiment of the invention. As noted above, depending on the pressure and temperature of the fluid, reinforcement of the non-magnetic and non-conductive tube may be desirable. Thus, in system 500, S2/Fiberglass and Peek composite fibers are tightly wrapped around the smooth surface of system 400 (FIG. 4).

The wall thickness of ceramic tube 401 is usually dictated by the physics of a particular measurement, but generally is less than a few millimeters, such as the dimensions described above with regard to FIG. 2. For example, a NMR measurement is usually more accurate and precise when the RF coil is close to the fluid. During NMR measurement, the RF coil is used to excite the NMR sensitive nuclei in the fluids in the passageway inside of ceramic tube 401. A thinner walled tube generally improves the signal-to-noise ratio of the NMR measurement. Supporting composite fibers 501 allow for better NMR performance if they are also non-conductive and non-magnetic.

The flowline of a fluid sampling tool is often used to convey fluids at pressures of 30 kpsi. With a 20% safety factor, a tube can be designed to withstand at least 36 kpsi without failure. Supporting composite fibers 501 may provide reinforcement to tube 401, thereby facilitating a design with relatively thin ceramic walls and high pressure integrity.

The length of tube 401 is generally determined, at least in part, by requiring the measurement-sensitive region of tube 401 to be an appropriate distance from the joined steel portion of the flowline so as not to perturb the measurements. Typically, this distance is a few inches on either side of the antenna and/or coil that is attached to the tube.

In the discussion of FIG. 4, it was noted that grooves may be used in which to place the wires of a measuring device, thereby providing a smooth surface for a tube. However, in some embodiments, there may be a possibility that grinding or cutting grooves in the tube (e.g., tube 401) will cause stress points that weaken the apparatus. An alternate embodiment includes placing the RF coil and associated wires onto the ceramic tube without cutting or grinding grooves and subsequently wrapping the tube and wires with a S2/Fiberglass and Peek composite or other reinforcement material. Yet another embodiment includes placing a sleeve made from Peek or a Peek/glass composite, for example over the ceramic tube. Grooves for the wire are then cut into the sleeve. Wire is wrapped into the grooves, and S2/Fiberglass and Peek composite fibers or other reinforcement material are then tightly wrapped around the smooth surface.

A ceramic tube is often desirable for many embodiments due to the following qualities: (1) ceramic is generally non-conductive and non-magnetic, (2) ceramic generally contributes little or nothing to the NMR signal, (3) ceramic is generally resistant to corrosive reservoir fluids, (4) ceramic is impermeable to gases, and (5) ceramic properties generally do not change appreciably at high reservoir temperatures.

While the examples above use a zirconia-based ceramic for the tube and a S2/Fiberglass-Peek composite to wrap the tube, the invention is not limited to those materials. A variety of materials may be used to construct the tube as long as the material is non-conductive and non-magnetic and can withstand the outward pressure of the fluid. A further example of an appropriate ceramic material is silicon nitride.

Further, a variety of materials and techniques to reinforce such tubes are possible. Other wrapping materials that may be used include carbon fibers. However, carbon fibers are somewhat conductive and may cause a loss in signal-to-noise ratio that may or may not be acceptable for some applications. One alternative to reinforcement with a wrapped composite material is to use an unsupported ceramic flowline (e.g., apparatus 200 of FIG. 2 or apparatus 400 of FIG. 4) that is pressure compensated using a fluid external to the tube. The fluid outside the tube is generally selected so that it does not contribute to the NMR signal of the reservoir fluid inside of the flowline. The pressure on the unsupported tube is the differential pressure between the reservoir pressure and the pressure of the compensating fluid. The pressure outside of the tube can be maintained at the hydrostatic pressure of the borehole fluid by using a floating piston that is in pressure communication with the borehole. An embodiment of this kind of apparatus is shown in FIG. 6.

Figure 6:
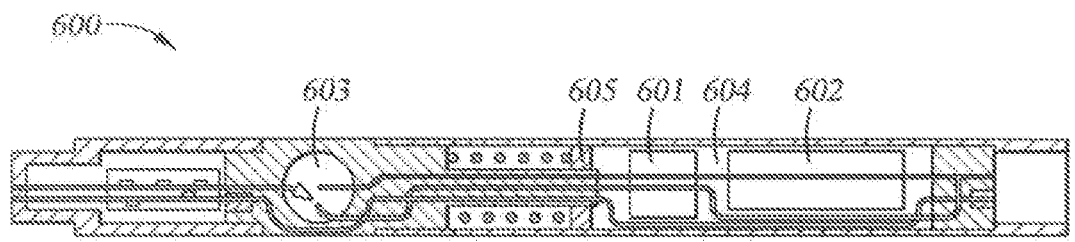
FIG. 6 shows the flowline of FIG. 1 adapted for use in a NMR module for a fluid sampling tool.

FIG. 6 is an illustration of exemplary system 600, which is a NMR module for a fluid sampling tool according to one embodiment of the invention. System 600 includes two NMR magnets 601 and 602 and valve 603 that can be used to divert fluid through the magnets so that NMR measurements can be performed. The magnet section contains compensating fluid 604 that is in pressure contact with the borehole fluid via spring-loaded piston 605. An example of an appropriate compensating fluid 604 is FLUORINERT™, available from the DuPont Chemical Company. Additional or alternative embodiments may include other compensating fluids.

In an embodiment that uses system 600, a NMR-compatible section of flowline, such as apparatus 200 of FIG. 2 or apparatus 400 of FIG. 4, is placed near magnets 601 and 602 in compensating fluid 604. The compensating fluid is then used to reduce the pressure differential between the fluid in the flowline and the exterior of the tube.

Figure 7:
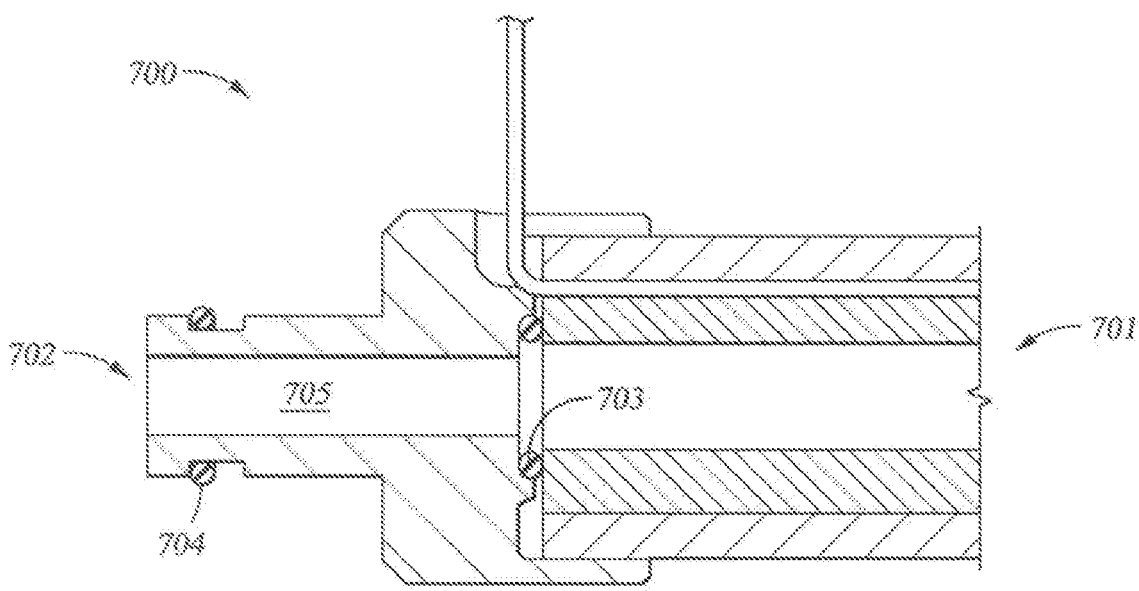
FIG. 7 is a cross-sectional view of one embodiment of an adapter used to join the non-conductive and non-magnetic portion of the flowline of FIG. 1 to the remaining portion of the flowline of FIG. 1.

FIG. 7 is a cross-sectional view of exemplary system 700 according to one embodiment of the invention. System 700 illustrates a technique that may be used in some embodiments to connect flowline section 701 (e.g., apparatus 200 of FIG. 2 or apparatus 400 of FIG. 4) to a conventional section of flowline (e.g., a metal section, not shown here) through use of adapter 702. Adapter 702 has an adapter passageway 705 in fluid communication with flowline 701. System 700 employs an O-ring face seal 703. Connection adapter 702 "floats" (i.e., can move axially) with respect to flowline 701 and is adapted to be pushed against flowline section 701 with, for example, a spring (not shown). An adapter seal interface 704 is located near the end of adapter 702 opposite the end carrying O-ring face seal 703. The outer diameter of adapter seal interface 704 is slightly larger than the outer diameter of O-ring face seal 703. That produces a net axial compressive force on face seal 703 from the pressurized fluid in passageway 705 and flowline 701, in addition to the external force from the spring, that increases with increasing fluid pressure, ensuring a more reliable seal. Although O-ring seals are described above, other seal elements may be used.

Figure 8:
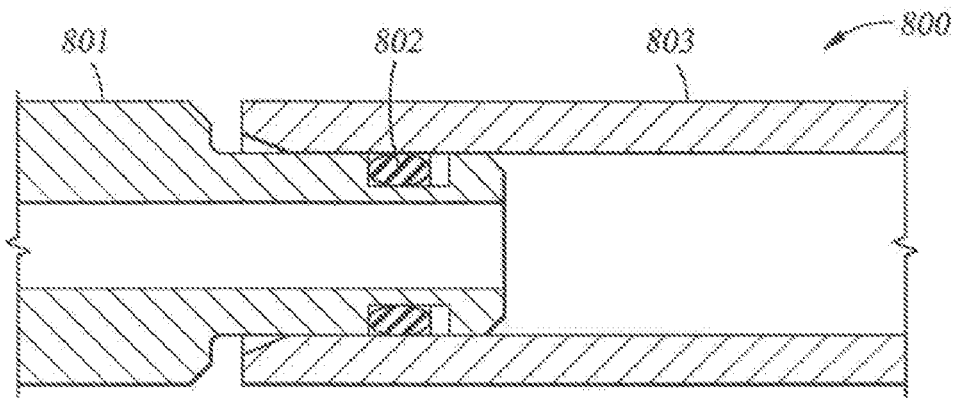
FIG. 8 a cross-sectional view of an alternative embodiment of an adapter used to join the non-conductive and non-magnetic portion of the flowline of FIG. 1 to the remaining portion of the flowline of FIG. 1.

FIG. 8 is a cross-sectional view of exemplary system 800 according to one embodiment of the invention. FIG. 8 shows an alternative technique for connecting flowtube 803. In contrast to system 700 of FIG. 7, system 800 employs adapter 801 that fits inside the flowpath of a portion of a flowtube 803 (e.g., apparatus 200 of FIG. 2 or apparatus 400 of FIG. 4). The seal is provided by O-ring 802. Little, if any, compressive load bears on the end face of flowtube 803, thereby minimizing additional stresses on flowtube 803 caused by end load forces.

The systems of FIGS. 7 and 8 are exemplary, and other techniques for connection may be adapted for use in one or more embodiments. Further, there is no requirement that the non-magnetic and non-conductive portion be placed at the end of the flowline. Adapters at each end can be used to place a non-magnetic and non-conductive portion at nearly any point in the flowline.

Figure 9:
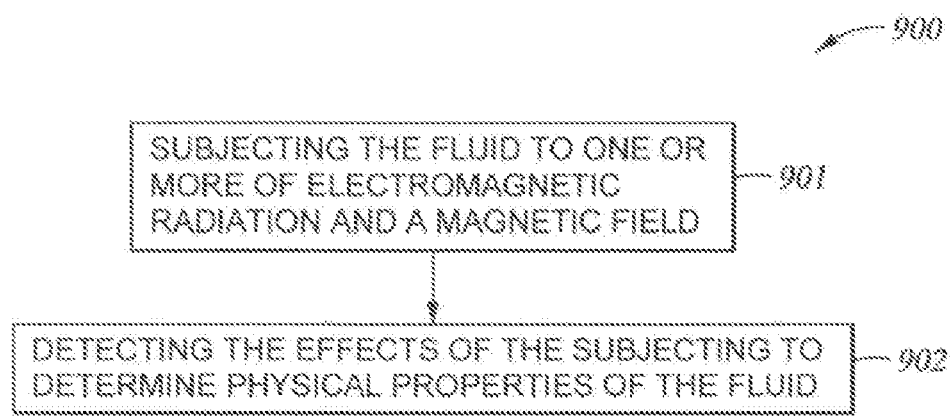
FIG. 9 is a block diagram of a method to make measurements on fluid in a non-conductive and non-magnetic portion of a flowline in a downhole tool in accordance with the present invention.

FIG. 9 is a diagram of exemplary method 900 according to one embodiment of the invention for testing physical properties of a high-pressure and/or high temperature fluid that is flowing through a non-magnetic and non-conductive section of a borehole fluid sample tool flowline. In one example, the non-magnetic and non-conductive section of the flowline is the same as or similar to apparatus 200 of FIG. 2. In step 901, the fluid is subjected to one or more of electromagnetic radiation and a magnetic field from inside or outside the non-conductive and non-magnetic section. In some embodiments, step 901 includes radiating electromagnetic waves through the non-conductive and non-magnetic section and through the fluid. For example, such radiating may be performed using an RF coil wrapped around the non-magnetic and non-conductive section of the flowline. Additionally or alternatively, step 901 may include creating a magnetic field from inside or outside of the non-conductive and non-magnetic portion that affects nuclei in the fluid. In one example, the magnetic field can be created by a permanent magnet or a pulsed field gradient coil.

In step 902, the effects of the subjecting are detected in order to determine physical properties of the fluid. In an example wherein the fluid is subjected to electromagnetic radiation, step 902 includes detecting the effects of the subjecting to determine physical properties of the fluid. For instance, an RF coil may detect the electromagnetic waves that are passed through the fluid or reflected back from the fluid to determine, for example, fluid conductivity, index of refraction, optical absorbance, or dielectric constant of the fluid. In an example wherein a magnetic field is created, step 902 includes detecting the effects on the nuclei from the magnetic field and RF pulses from outside of the non-conductive and non-magnetic portion to determine nuclear magnetic resonance properties of the fluid.

Figure 10:
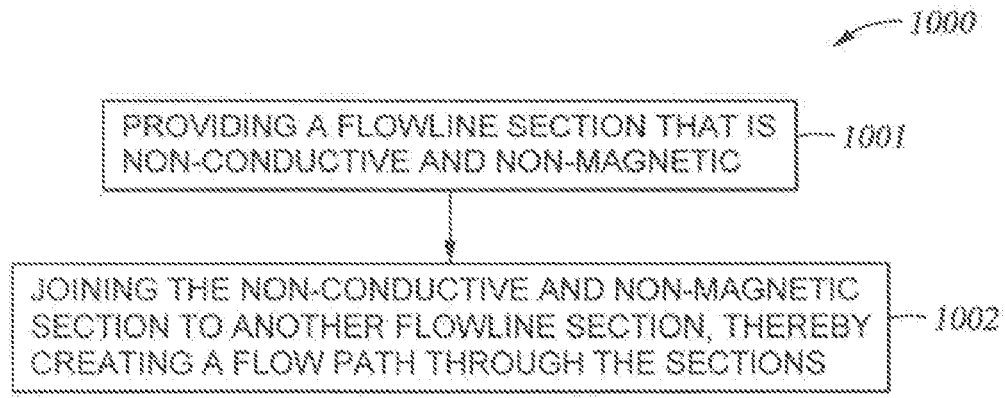
FIG. 10 is a block diagram of a method to make a wellbore fluid sampling tool flowline having a non-conductive and non-magnetic portion of a flowline in accordance with the present invention.

FIG. 10 is a diagram of exemplary method 1000 according to one embodiment of the invention for making a borehole fluid sample tool flowline. In step 1001, a flowline section is provided that is non-conductive and non-magnetic. In one example, the non-conductive and non-magnetic section is a tube constructed from a material, such as YTZP hipped ceramic, as shown and described with regard to FIG. 2. The tube may further include a layer that is designed to reinforce it against pressure from a high-pressure fluid. An example of such a layer includes S2/Fiberglass and Peek composite wrapped around the outside of the tube, as shown and described with regard to FIGS. 3A and 3B.

In step 1002, the non-conductive and non-magnetic section is joined to another flowline section, thereby creating a flow path through the sections. In one example, the other flowline section may be a section of a conventional borehole sample tool flowline constructed of steel. Various techniques for performing the joining are possible. In one embodiment, the joining includes providing a unit that fits around an end of the non-conductive and non-magnetic section and includes a seal interface therein that abuts the end of the non-conductive and non-magnetic section. An example of one such unit is illustrated in FIG. 7. An O-ring seal placed concentrically within the seal interface is compressively forced against the end of the non-conductive and non-magnetic section. In another embodiment, step 1002 includes providing a fitting adapted to fit within an inner diameter of the non-conductive and non-magnetic section, wherein the fitting includes an O-ring. An example of one such unit is illustrated in FIG. 8. A seal is then created with the inner diameter and the O-ring.

Various embodiments may provide one or more advantages over prior art systems. For example, the non-magnetic and non-conductive quality of the tube allows for little or no interference with RF sensors. Accordingly, some embodiments can accommodate sensors on or near the exterior of the tube. Also, embodiments in which the non-magnetic and non-conductive tube is wrapped with reinforcing material or placed in pressure-compensating fluid may facilitate the use of a thin-walled ceramic tube, thereby allowing the placement of sensors within a few millimeters of the fluid. Since those sensors are placed externally to the flow path, they are not subjected to the potentially corrosive or abrasive nature of the fluid. Other embodiments may use sensors placed in the interior of the flowline or a combination of sensors inside and outside the flowline.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function to achieve substantially the same result as the corresponding embodiments described herein may be used according to the present invention. Accordingly, the appended claims are intended to include within their scope such processes, machines, manufacture, compositions of matter, means, methods, or steps.

What is claimed is:

1. An apparatus to perform measurements on fluid in a wellbore fluid sample tool, comprising:
   a flowline having a first portion and a second portion disposed in the sample tool, wherein the first portion is non-magnetic and non-conductive; and
   an adapter connecting the first portion and the second portion, the adapter comprising:
      a fitting adapted to fit around an end of the first portion and a first seal therein that abuts the end of the first portion;
      a passageway through the adapter; and
      a seal interface coupled to the second portion and having a second seal, wherein the second seal has a larger outer diameter than the first seal.

2. The apparatus of claim 1, wherein the first portion is ceramic.

3. The apparatus of claim 2, wherein the ceramic is a hot isostatically pressed zirconia.

4. The apparatus of claim 1, wherein the first portion comprises a ceramic tube and a non-conductive and non-magnetic reinforcement element disposed thereon.

5. The apparatus of claim 1, wherein the first portion includes a sensor.

6. The apparatus of claim 5, wherein the sensor comprises a radio frequency coil.

7. The apparatus of claim 5, wherein the sensor comprises a radio frequency coil and a pulsed field gradient coil.

8. The apparatus of claim 5, wherein the sensor comprises an electromagnetic transmitter and receiver pair.

9. The apparatus of claim 5, wherein the first portion comprises a ceramic tube, and wherein the sensor is mounted on a smooth surface of the tube.

10. An apparatus to perform measurements on fluid in a wellbore fluid sample tool, comprising:
    a flowline having a first portion and a second portion disposed in the sample tool, wherein the first portion is non-magnetic and non-conductive; and
    an adapter connecting the first portion and the second portion, the adapter comprising a fitting adapted to fit within an inner diameter of the first portion, wherein the fitting includes a seal that seals against the inner diameter.

11. The apparatus of claim 10, wherein the first portion is ceramic.

12. The apparatus of claim 11, wherein the ceramic is a hot isostatically pressed zirconia.

13. The apparatus of claim 10, wherein the first portion comprises a ceramic tube and a non-conductive and non-magnetic reinforcement element disposed thereon.

14. The apparatus of claim 10, wherein the first portion includes a sensor.

15. The apparatus of claim 14, wherein the sensor comprises a radio frequency coil.

16. The apparatus of claim 14, wherein the sensor comprises a radio frequency coil and a pulsed field gradient coil.

17. The apparatus of claim 14, wherein the sensor comprises an electromagnetic transmitter and receiver pair.

18. The apparatus of claim 14, wherein the first portion comprises a ceramic tube, and wherein the sensor is mounted on a smooth surface of the tube.

19. An apparatus to perform measurements on fluid in a wellbore fluid sample tool, comprising:
    a flowline having a first portion and a second portion disposed in the sample tool, wherein the first portion comprises a non-magnetic and non-conductive ceramic tube; and
    a sensor placed in a groove cut into the ceramic tube.

20. The apparatus of claim 19, further comprising an adapter coupling the first portion to the second portion.

21. The apparatus of claim 19, wherein the ceramic is a hot isostatically pressed zirconia.

22. The apparatus of claim 19, further comprising a non-conductive and non-magnetic reinforcement element disposed thereon.

23. The apparatus of claim 19, wherein the sensor comprises a radio frequency coil.

24. The apparatus of claim 19, wherein the sensor comprises a radio frequency coil and a pulsed field gradient coil.

25. The apparatus of claim 19, wherein the sensor comprises an electromagnetic transmitter and receiver pair.

26. An apparatus to perform measurements on fluid in a wellbore fluid sample tool, comprising:
    a flowline having a first portion and a second portion disposed in the sample tool, wherein the first portion comprises a non-magnetic and non-conductive ceramic tube;
    a sleeve placed over the ceramic tube, the sleeve having a groove; and
    a sensor placed in the groove.

27. The apparatus of claim 26, further comprising an adapter coupling the first portion to the second portion.

28. The apparatus of claim 26, wherein the ceramic is a hot isostatically pressed zirconia.

29. The apparatus of claim 26, further comprising a non-conductive and non-magnetic reinforcement element disposed thereon.

30. The apparatus of claim 26, wherein the sensor comprises a radio frequency coil.

31. The apparatus of claim 26, wherein the sensor comprises a radio frequency coil and a pulsed field gradient coil.

32. The apparatus of claim 26, wherein the sensor comprises an electromagnetic transmitter and receiver pair.

33. The apparatus of claim 26, wherein the sleeve and the sensor are wrapped with a non-conductive and non-magnetic reinforcement element.

* * * * *